United States Patent
Koike et al.

(10) Patent No.: US 6,239,911 B1
(45) Date of Patent: May 29, 2001

(54) VIEW ANGLE CONTROL SHEET AND METHOD FOR PRODUCING THE SAME

(75) Inventors: Toshihiro Koike, Urawa; Teruo Ohnuma, Tokyo; Satoshi Ako, Asaka; Yasunori Sugiyama, Yono, all of (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 08/835,472

(22) Filed: Apr. 8, 1997

(30) Foreign Application Priority Data

Apr. 10, 1996 (JP) .................................................. 8-114148

(51) Int. Cl.⁷ .............................. G02B 27/00; B29D 11/00
(52) U.S. Cl. ............................. 359/601; 359/613; 264/2.7
(58) Field of Search .................................... 359/601, 613, 359/614; 264/2.7

(56) References Cited

U.S. PATENT DOCUMENTS

| | | | |
|---|---|---|---|
| 2,749,794 | * 6/1956 | O'Leary | 359/614 |
| 3,511,563 | * 5/1970 | Erwin | 359/613 |
| 3,524,789 | 8/1970 | Olsen | 161/6 |
| 3,718,078 | * 2/1973 | Plummer | 95/49 |
| 4,621,898 | * 11/1986 | Cohen | 359/613 |
| 4,976,869 | * 12/1990 | Short et al. | 264/1.9 |
| 5,108,857 | 4/1992 | Kitayama et al. | 430/4 |
| 5,204,160 | * 4/1993 | Rouser | 428/167 |
| 5,384,658 | * 1/1995 | Ohtake et al. | 359/707 |

FOREIGN PATENT DOCUMENTS

| | | |
|---|---|---|
| 47-43845 | 11/1972 | (JP) . |
| 63-309902 | 12/1988 | (JP) . |
| 682607 | 3/1994 | (JP) . |

* cited by examiner

*Primary Examiner*—Cassandra Spyrou
*Assistant Examiner*—Mark A. Robinson
(74) *Attorney, Agent, or Firm*—Lorusso & Loud

(57) ABSTRACT

A view angle control sheet comprising a non-oriented light permeable polymer layer having cracks of regular directionality is disclosed. The view angle control sheet of the present invention has good view angle control property and can easily be obtained at low cost. The sheet having good view angle control property with respect to two or more directions can also easily be obtained as required at low cost. The view angle control sheet of the present invention can be used in office equipment displays, automobile meters, outdoor displays, windows and the like to desirably control view angles.

13 Claims, 4 Drawing Sheets

VIEW ANGLE CONTROL SHEET AND METHOD FOR PRODUCING THE SAME

BACKGROUND OF THE INVENTION

The present invention relates to a view angle control sheet, namely a sheet which passes light in some directions but not in other directions, and a method for producing it.

As sheets having a view angle control property, there have been known, for example, those described in Japanese Patent Publication No. Sho 47-43845, Japanese Patent Unexamined Publication No. Sho 63-309902, Japanese Patent Unexamined Publication No. Hei 6-82607 and the like.

Japanese Patent Publication No. Sho 47-43845 discloses a sheet having view angle control and obtained by laminating transparent discs and black discs alternately until a desired thickness is obtained and slicing the side surface of the laminated discs along the peripheries of the discs.

Japanese Patent Unexamined Publication 63-309902 discloses a view angle control film cured by ultra-violet rays from a specific direction to enable it to selectively scatter light of a specific irradiation angle. This patent document also teaches that light rays projected from two or more directions, i.e., rays projected with an angle component varying in two or more planes perpendicular to the film, can be selectively scattered, by curing the film with UV rays from two or more directions.

Japanese Patent Unexamined Publication No. Hei 6-82607 discloses a method for producing a view angle control film comprising folding a transparent polymer film with oriented polymer molecules using a blade or the like whose cutting edge is parallel to the direction of the molecular orientation and drawing the film in a direction perpendicular to the direction of the molecular orientation to produce cracks as stripes approximately parallel to the direction of the molecular orientation.

However, in the sheet of Japanese Patent Publication No. Sho 47-43845, since many transparent and black discs must be laminated until a desired thickness is obtained, the productivity is low and the obtained sheets are expensive. In addition, the sheet obtained by this method can control the view angle with respect to only one direction, i.e., it can control the view angle only with respect to light with an angle component varying in one plane perpendicular to the film and the laminated discs.

The film disclosed in Japanese Patent Unexamined Publication 63-309902 cannot completely shield light since it controls the transmission angle by reflection and scattering of angled rays. Further, it utilizes a special UV curing resin and its production requires a curing step, thereby resulting in expensive products. This method can provide sheets having view angle control property with respect to two or more directions. However, in order to provide such sheets, after producing a sheet having view angle control property in one direction, the steps of applying UV curing resin and exposure to UV rays must be repeated. This leads to extremely low productivity.

The method of Japanese Patent Unexamined Publication No. Hei 6-82607 is described as a method for overcoming the problems of the above prior art. However, this method requires films whose molecules are oriented. As such films, monoaxially stretched films are mentioned. However, in order to continuously produce the view angle control film with from a monoaxially stretching by this method, the monoaxially stretched film must have been stretched in the direction transverse to of the film. It is technically difficult to produce such a monoaxially stretched film and impossible to do so with sufficiently high productivity. In addition, in order to form cracks by this method, the film must be forced onto a blade with a quite large force while drawing the film. This step is likely to form many scratches on the film. Furthermore, the film obtained by this method has view angle control property for only one direction.

The present invention has been achieved to overcome the problems mentioned above and therefore an object of the present invention is to provide a view angle control sheet which can be easily produced at a low cost, exhibits excellent view angle control and can provide view angle control for as many directions as required. Another object of the present invention is to provide a method for producing such a view angle control sheet.

SUMMARY OF THE INVENTION

As a first aspect of the present invention, there is provided a view angle control sheet comprising a non-oriented light permeable polymer layer having cracks of regular directionality.

In one embodiment of the view angle control sheet according to the present invention, the non-oriented light permeable polymer layer having cracks of regular directionality is laminated on a light permeable substrate.

In another embodiment of the view angle control sheet according to the present invention, the cracks are regularly formed along only one direction.

In another embodiment of the view angle control sheet according to the present invention, the cracks are regularly formed along two or more directions.

In a further embodiment of the view angle control sheet according to the present invention, the cracks contain an additive.

In the above embodiment, the additive may be, for example, a light-absorbing substance or a light-scattering substance.

As a second aspect of the present invention, there is provided a method for producing a view angle control sheet comprising a non-oriented light permeable polymer layer having cracks of regular directionality, which method comprises linearly applying a force on the light permeable polymer layer in regular directionality, the force being sufficient for forming cracks on the layer, to form numerous cracks of regular directionality on the non-oriented light permeable polymer layer.

In an embodiment of the above method of the present invention, a non-oriented light permeable polymer layer laminated on a light permeable substrate is used.

In another embodiment of the above method of the present invention, an additive is introduced into the formed cracks.

In the above embodiment of the above method of the present invention, after introducing an additive into the cracks, a protective layer may be laminated on the light permeable polymer layer.

DETAILED DESCRIPTION OF THE INVENTION

Figure 1:
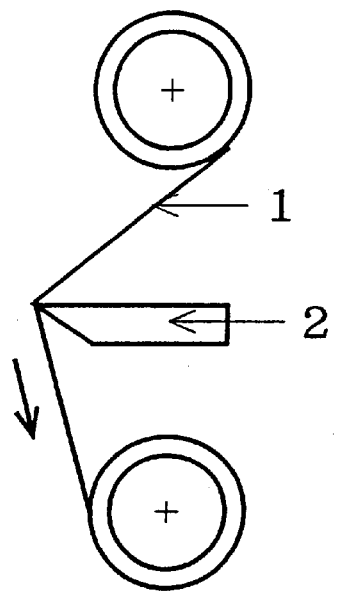
FIG. 1 illustrates one embodiment of the method for producing view angle control sheets of the present invention.

The view angle control sheet of the present invention is characterized in that it comprises a non-oriented light permeable polymer layer having cracks of regular directionality.

The term "regular directionality" used herein means that the cracks are formed in parallel along the length and the depth directions of the cracks. In the method for producing the view angle control sheets of the present invention, the non-oriented light permeable polymer layer is folded with application of a force while the layer is drawn along the direction perpendicular to the folded direction, thereby cracks are formed therein along the direction perpendicular to the drawing direction.

The term "non-oriented" used herein means that the film used for the light permeable polymer layer is not a film whose polymer molecules have been intentionally oriented by, for example, stretching during production. More specifically, it means a film having a stretching ratio of 1.2 or less with respect to both of the longitudinal direction and the transverse direction.

In the view angle control sheet of the present invention, light rays incident on the sheet in a direction approximately parallel to the direction of the depth of the cracks can pass through the sheet, but otherwise angled rays cannot pass because of the cracks. Thus, the view angle through the sheet is controlled depending on the angle component in a plane perpendicular to the sheet and the direction of the length of the cracks. The cracks may be formed in two or more directions. In such a case, the view angle through the sheet is controlled depending on the angle components in two or more planes perpendicular to the sheet and the two or more directions of the length of the cracks (view angle is controlled in two or more directions).

The view angle control sheet of the present invention may be a sheet composed solely of the non-oriented light permeable polymer layer, or composed of a sheet comprising a non-oriented light permeable polymer layer laminated on a light permeable substrate. The term "sheet" used herein encompasses both sheets and "films".

The sheet composed solely of the non-oriented light permeable polymer layer can be produced by hot press, melt extrusion or the like. The sheet comprising a non-oriented light permeable polymer layer laminated on a light-permeable substrate can be produced by coating or extruding a material for the light permeable polymer layer on a light permeable substrate such as a polyester film, or by co-extrusion of a material for the light permeable polymer layer and a material for the light permeable substrate.

The light permeable polymer layer of the present invention may be formed of any of various thermoplastic, thermosetting, UV-ray-curing or other such polymer materials enabling cracks to be formed therein. Examples of the polymer material include, styrene resins such as polystyrenes, styrene/acrylonitrile copolymers, acrylonitrile/butadiene/styrene copolymers and styrene/butadiene copolymers, other thermoplastic resins such as polymethyl methacrylates, polyvinyl chlorides, polyvinylidene fluorides and cellulose nitrates, thermosetting resins such as epoxy resins, phenolic resins and unsaturated polyesters, various ultra-violet-ray-curing resins and the like. Two or more of these resins may be used in combination or they may be mixed with other resins. Among these, polystyrenes are particularly preferred.

The cracks are formed in the non-oriented light permeable polymer layer by linearly applying a force sufficient for forming cracks in the layer, for example, by bending the layer, in regular directionality.

Accordingly, the present invention further provides a method for producing a view angle control sheet comprising a non-oriented light permeable polymer layer having cracks of regular directionality, which method comprises linearly applying a force to the layer at numerous positions on the layer in regular directionality, the force being sufficient for forming cracks in the layer, to form numerous cracks of regular directionality in the layer.

The method for producing the view angle control sheet will be specifically explained hereinafter with respect to the case of a sheet composed solely of the non-oriented light permeable polymer layer.

Figure 2:
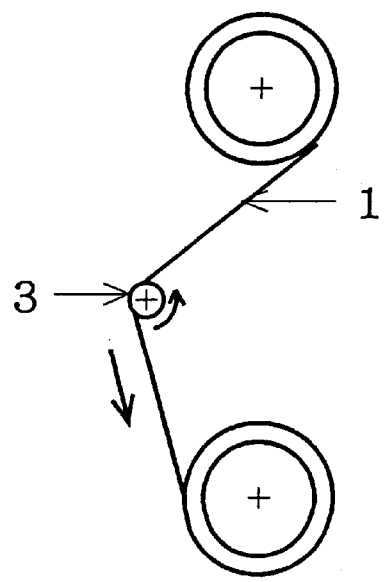
FIG. 2 illustrates another embodiment of the method for producing view angle control sheets of the present invention.
Figure 3:
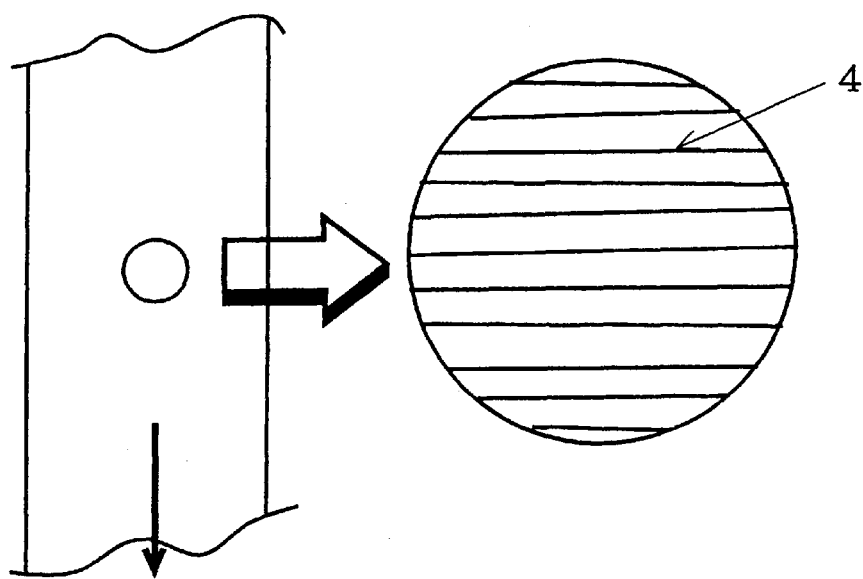
FIG. 3 illustrates another embodiment of the method for producing view angle control sheets of the present invention.
Figure 4:
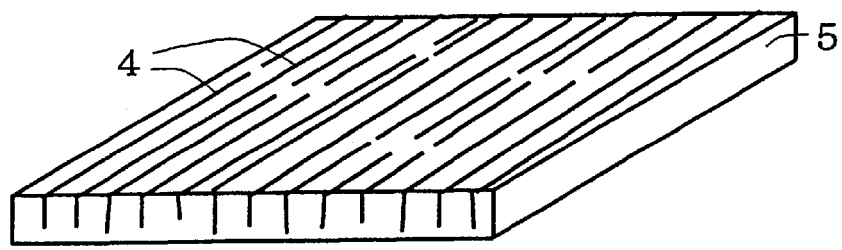
FIG. 4 shows one example of the view angle control sheet of the present invention.

A material for the non-oriented light permeable polymer layer, such as one of those mentioned above, is made into a sheet by hot press or melt extrusion and the sheet is drawn to an extent that does not cause the polymer molecules in the sheet to be oriented. The obtained sheet 1 is drawn under tension while the edge of a blade 2 is pressed onto the sheet so that the sheet is properly folded (FIG. 1) or while a bend 3 is formed on the sheet (FIG. 2) to continuously apply a force sufficient for forming cracks in the sheet. In both cases, a view angle control sheet having cracks 4 in the direction perpendicular to the drawing direction can be obtained (FIGS. 3 and 4). In FIGS. 1 to 3, the downward arrows indicate the drawing direction.

Figure 5:
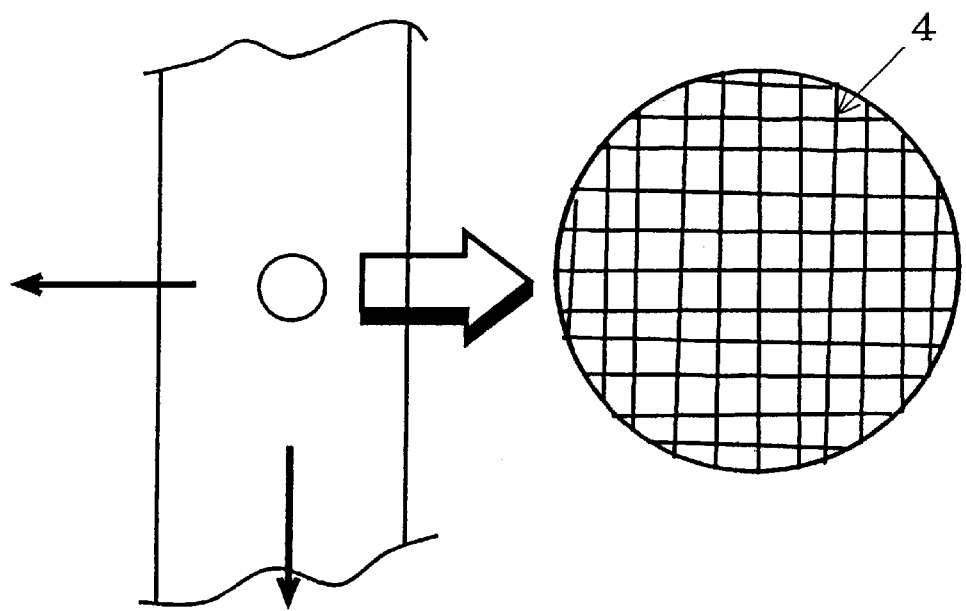
FIG. 5 illustrates a further embodiment of the method for producing view angle control sheets of the present invention.

A view angle control sheet having view angle control with respect to two or more directions can be obtained by repeating the above procedure for two or more directions (FIG. 5).

Though the thickness of the sheet is not particularly limited, it is desirably 100 μm or less so that good operability of the crack forming operation can be obtained. The folding angle for forming cracks is decided depending on the thickness and kind of the material of the sheet.

In forming cracks, the temperature of the atmosphere in which the cracks are formed is also important. This is because, even when the same material is used, cracks may or may not be formed depending on the operation temperature when the sheet is bent. Therefore, the atmosphere temperature affects the production process and hence the properties of the products.

For example, a polymer material producing cracks at ordinary temperature is very beneficial from the point of productivity because the production process can be carried out at ordinary temperature. However, a view angle control sheet made of such a material is likely to undergo formation of new cracks when the sheet is bent. Accordingly, to obviate such a problem, it is necessary to laminate the sheet on a substrate of a suitably hard material such as a relatively rigid plastic, or to mount the sheet on a rigid object.

On the other hand, a polymer material producing cracks only at a temperature of, for example, 0° C. or less is disadvantageous from the point of productivity because a low-temperature atmosphere is required for the crack forming process. However, the view angle control sheet made of such a material does not form unnecessary cracks at ordinary temperature even when it is bent along a direction different from the direction of the cracks.

Therefore, considering these factors, a polymer material suitable for the intended purpose should be selected and a skilled person will be able to easily select a polymer material suitable for the intended purpose.

The polymer layer having cracks formed as described above may be applied on another substrate. Further, if required, a substrate such as a polyester film or a resin coat may be laminated on the light permeable polymer layer formed with cracks.

Figure 6:
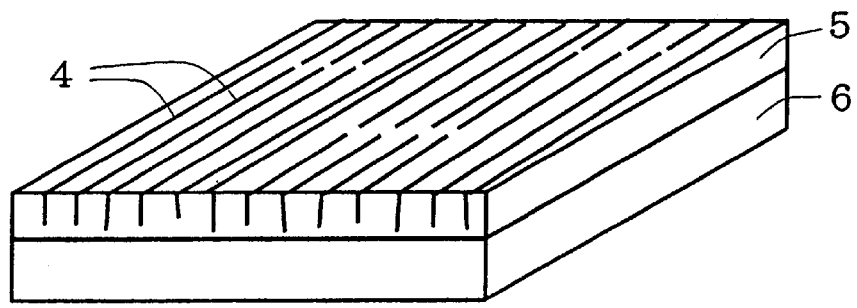
FIG. 6 shows another example of the view angle control sheet of the present invention.

As described above, the view angle control sheet of the present invention may comprise a light permeable polymer layer laminated on a substrate, and cracks can be formed in a light permeable polymer layer laminated on a substrate in a manner similar to the above. For example, the view angle control sheet of the present invention having a light permeable polymer layer formed by a coating technique can be produced as follows. First, a coating solution is prepared by dissolving a polymer material for the light permeable polymer layer, such as one of those mentioned above, in a suitable solvent, a light permeable substrate 6 such as a polyester film is coated with the coating solution using a wire bar or the like and the coating is dried to form a coated layer. Then, as described above, the obtained laminated sheet is drawn under tension while the edge of a blade is pressed onto the sheet or while a bend is formed in the sheet to continuously apply a force sufficient for forming cracks in the sheet. In both cases, a view angle control sheet comprising a light permeable polymer layer 5 having cracks in the direction perpendicular to the drawing direction can be obtained (FIG. 6).

The coating solution may include a surfactant to improve the coating property and/or an antistatic agent such as quaternary ammonium salts to impart an antistatic property.

The view angle control sheet of the present invention can be also produced by forming a non-oriented light permeable polymer layer on a light permeable substrate such as a polyester film by the melt extrusion technique instead of the coating technique and treating the obtained laminated sheet as described above to form cracks, thereby obtaining a view angle control sheet comprising a light permeable polymer layer having cracks in the direction perpendicular to the drawing direction.

In the view angle control sheet comprising the light permeable polymer layer formed by coating or melt extrusion on the light permeable substrate, an adhesive layer for improving adhesion between the two layers may be provided between the layers and an antistatic layer may be provided for imparting an antistatic property.

Figure 7:
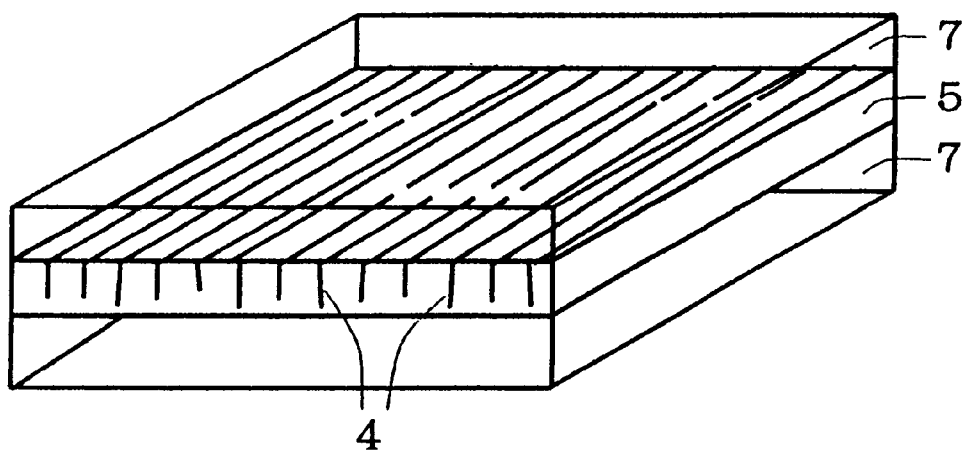
FIG. 7 shows a further example of the view angle control sheet of the present invention.

Further, the view angle control sheet of the present invention can be produced by the co-extrusion technique. In this case, a light permeable polymer material for the substrate such as polyethylene and a polymer material for the light permeable polymer layer are co-extruded from a T-die while the extruded sheet is drawn with a force that does not cause orientation of the polymer molecules of the sheet, thereby forming a laminated sheet. Co-extrusion can also be used to produce a laminate of three or more layers including one or more additional layers 7 (protective layers) made of, for example, polyethylene, on one or both surfaces of the light permeable polymer layer 5 (FIG. 7). The obtained laminate is treated in the same manner as described above to afford a view angle control sheet comprising a light permeable polymer layer having cracks along a direction perpendicular to the direction of drawing.

Also in the above embodiments of the method of the invention for producing the view angle control sheet comprising the light permeable polymer layer and the light permeable substrate, a sheet having view angle control property with respect to two or more directions can be obtained as described above. Again, the atmosphere temperature may affect the formation of the cracks.

In the view angle control sheet of the present invention, a pigment or the like can be added to the light permeable polymer layer and/or the substrate and/or other layers to desirably color the sheet or obtain desired light transmission of the sheet.

Further, an additive such as a light-absorbing substance or a light-scattering substance can be introduced into the formed cracks to improve the view angle control property. The light-absorbing substance may be of color and may be, for example, a dye or pigment. Examples of such a dye or pigment include carbon black, iron black, molybdate orange and cyanide blue. A black pigment or dye such as carbon black or aniline black is particularly preferred in terms of the effect of improving the view angle control property.

A light-scattering substance may also be introduced into the cracks to improve the view angle control property. Usable light-scattering substances include extender pigments such as zinc oxide, titanium dioxide, calcium carbonate and silica, metal powders such as aluminum powder and the like.

These substances can be introduced into the cracks by dissolving or dispersing them in a solvent and immersing a sheet comprising a light permeable polymer layer having cracks into the solution or dispersion. The solution or dispersion may further contain a resin material.

Though the sheet comprising a light permeable polymer layer having cracks may be immersed into the solution or dispersion as is, the solution or dispersion can be more efficiently introduced into the cracks by slightly bending the sheet so that openings of the cracks are expanded.

Furthermore, after introducing the additive into the cracks, a protective layer may be laminated on the light permeable polymer layer.

EXAMPLES

The present invention will be further explained with reference to the following examples, but the scope of the present invention is not limited thereto.

Example 1

A polystyrene resin (666R: Asahi Chemical Industry Co., Ltd.) was dissolved in a mixed solvent of methyl ethyl ketone and toluene, applied to a transparent polyester film having a thickness of 50 $\mu$m with a wire bar and dried by heating to form a light permeable polymer layer having a thickness of 30 $\mu$m.

Then, the obtained laminate was drawn while a Teflon blade was pressed onto the polyester film side of the laminate to form numerous cracks in the light permeable polymer layer. Thus, a view angle control sheet of the present invention was obtained.

In the view angle control sheet obtained, the cracks formed in the light permeable polymer layer had regular directionality along the film thickness direction and the direction perpendicular to the drawing direction while the polyester film remained transparent.

Though the obtained view angle control sheet had a view angle control property as it was, the view angle control property was further enhanced by immersing the sheet into a black coloration solution in order to color the cracks black.

<Composition of black coloration solution>

| | |
|---|---|
| Acrylic acid/methyl methacrylate/ 2-hydroxyethy methacrylate copolymer (copolymerization ratio = 1/4/5) | 5 parts by weight |
| Carbon black (MA-100, Mitsubishi Chemical Corp.) | 5 parts by weight |
| Aqueous ammonia (reagent grade) | 3 parts by weight |
| Water | 77 parts by weight |
| Isopropyl alcohol | 10 parts by weight |

This view angle control sheet colored black exhibited better view angle control property.

Example 2

A polystyrene resin layer was formed as a coating on a polyester film in a manner similar to that of Example 1 and the obtained laminate was drawn while being bent by pressing it onto a roller having a diameter of 5 mm, to continuously form numerous c racks in the polystyrene layer (light permeable polymer layer).

The cracks were formed in the polystyrene layer with regular directionality with respect to the direction of the thickness of the layer and the direction perpendicular to the drawing, while the polyester film remained transparent without streaks. The obtained view angle control sheet exhibited excellent view angle control property.

Example 3

A polystyrene resin (666R, Asahi Chemical Industry Co., Ltd.) was melt-pressed under heating to form a sheet having a thickness of 50 µm.

This sheet was continuously bent in a manner similar to that of Example 1 to form numerous cracks along the direction parallel to the blade, so that a view angle control sheet was obtained. Though this sheet had view angle control property, the cracks were colored blue by introducing a blue dye into the cracks using a blue coloration solution having the following composition. The obtained view angle control sheet exhibited excellent view angle control property.

<Composition of blue coloration solution>

| | |
|---|---|
| Blue dye (Victoria Pure Blue FGA, Hodogaya Chemical Co., Ltd.) | 5 parts by weight |
| Ethyl alcohol | 95 parts by weight |

Example 4

An acrylonitrile/styrene copolymer resin (Cevian NO20, Daicel Chemical Industries Co., Ltd.) was dissolved in a mixed solvent of methyl ethyl ketone and toluene, applied to a transparent polyester film having a thickness 25 µm by a wire bar and dried to obtain a sheet having a light permeable polymer layer of a thickness of 50 µm.

This sheet was continually bent in a manner similar to that of Example 1 to form cracks. Then, the sheet was again continually bent along a direction perpendicular to the direction along which the sheet was previously bent to afford a view angle control sheet having cracks in the longitudinal and transverse directions.

This view angle control sheet exhibited view angle control property in the horizontal direction in addition to the vertical direction.

Example 5

An acrylonitrile/styrene copolymer (Lytac 100PC, Mitsui Toatsu Chemicals Inc.) and a high density polyethylene (6100A, Tosoh Corp.) were extruded from a T-die while the extruded laminate was drawn to an extent that did not cause the copolymers to be oriented. A laminate whose layers each had a thickness of 50 µm was obtained.

This sheet was continuously bent with a blade in a manner similar to that of Example 1 to form numerous cracks in the acrylonitrile/styrene copolymer layer.

This sheet also exhibited view angle control property.

As explained above, according to the present invention, a sheet having good view angle control property can easily be obtained at low cost.

A sheet having good view angle control property with respect to two or more directions can also easily be obtained as required at low cost.

The view angle control sheet of the present invention can be used in office equipment displays, automobile meters, outdoor displays, windows and the like to desirably control view angles.

What is claimed is:

1. A method for producing a view angle control sheet comprising a non-oriented light permeable polymer layer having cracks of regular directionality, which method comprises linearly applying a force on the light permeable polymer layer, to bend said sheet through an angle sufficient to form numerous cracks of regular directionality in the non-oriented light permeable polymer layer.

2. The method of claim 1, further comprising coating said non-oriented light permeable polymer layer onto a light permeable substrate.

3. The method of claim 1, further comprising introducing an additive into the formed cracks.

4. The method of claim 3, further comprising, after introducing the additive into the cracks, laminating a protective layer onto the light permeable polymer layer.

5. A view angle control sheet comprising a non-oriented light permeable polymer layer having cracks of regular directionality, said cracks being formed in said layer by a process comprising applying a linear force across said sheet to bend said sheet through an angle sufficient to cause formation of said cracks.

6. The view angle control sheet of claim 5, wherein the non-oriented light permeable polymer layer having cracks of regular directionality is laminated on a light permeable substrate.

7. The view angle control sheet of claim 5, wherein the cracks are regularly formed along only one direction.

8. The view angle control sheet of claim 7 wherein said cracks extend in said one direction across one dimension of said sheet.

9. The view angle control sheet of claim 5, wherein the cracks are regularly formed along two or more directions.

10. The view angle control sheet of claim 9 wherein said cracks extend in two directions across two dimensions of said sheet.

11. The view angle control sheet of claim 5, wherein the cracks contain an additive.

12. The view angle control sheet of claim 11, wherein the additive is a light-absorbing substance.

13. The view angle control sheet of claim 11, wherein the additive is a light-scattering substance.

* * * * *

UNITED STATES PATENT AND TRADEMARK OFFICE
CERTIFICATE OF CORRECTION

PATENT NO.    : 6,239,911 B1
DATED         : December 11, 2001
INVENTOR(S)   : Lehnst It is certified that error appears in the above-identified patent and that said Letters Patent is hereby corrected as shown below:

<u>Title page,</u>
Item [73], Assignee: "Volkswagne AG (DE)" should read -- Volkswagen AG, Residence: Wolfsburg, Germany --

Signed and Sealed this

Tenth Day of September, 2002

Attest:

Attesting Officer

JAMES E. ROGAN
*Director of the United States Patent and Trademark Office*